US012352229B2

(12) United States Patent
Wieschollek

(10) Patent No.: US 12,352,229 B2
(45) Date of Patent: Jul. 8, 2025

(54) FUEL INJECTOR DUST SEAL

(71) Applicant: Robert Bosch GmbH, Stuttgart (DE)

(72) Inventor: Sebastian Wieschollek, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/506,382

(22) Filed: Nov. 10, 2023

(65) Prior Publication Data

US 2024/0209820 A1 Jun. 27, 2024

Related U.S. Application Data

(60) Provisional application No. 63/476,697, filed on Dec. 22, 2022.

(51) Int. Cl.
*F02M 61/14* (2006.01)

(52) U.S. Cl.
CPC ....... *F02M 61/14* (2013.01); *F02M 2200/858* (2013.01)

(58) Field of Classification Search
CPC .......... B23P 6/00; B23P 6/04; B25B 23/0078; B25B 27/0028; F02M 53/043; F02M 61/14; F02M 2200/858; F02M 2200/8076; F02M 2200/16; F02M 55/04; F02M 61/168
USPC .......................................................... 123/470
See application file for complete search history.

(56) References Cited

U.S. PATENT DOCUMENTS

| | | | | |
|---|---|---|---|---|
| 2012/0217323 A1* | 8/2012 | Martinsson | F02M 61/166 | 72/342.2 |
| 2013/0133603 A1* | 5/2013 | Clark | F02M 61/14 | 123/143 R |
| 2016/0138540 A1* | 5/2016 | Franks | F02M 61/14 | 123/470 |
| 2017/0051713 A1* | 2/2017 | Peters | F02M 61/14 | |
| 2019/0255664 A1* | 8/2019 | Lukasik | B25B 23/0078 | |
| 2022/0298997 A1* | 9/2022 | Hembury | F02M 61/168 | |
| 2023/0019002 A1* | 1/2023 | Hahn | F02M 53/046 | |

* cited by examiner

*Primary Examiner* — Logan M Kraft
*Assistant Examiner* — Johnny H Hoang
(74) *Attorney, Agent, or Firm* — Maginot, Moore & Beck LLP

(57) ABSTRACT

This disclosure is directed to a fuel injector dust seal comprising: a sleeve arranged between a fuel injector and a fuel injector receiving aperture of a cylinder head, the sleeve defining a longitudinal axis with a first axial end and a second axial end; the sleeve further comprising: a first section, the first segment defining a first inner perimeter configured to be in contact with a first outer perimeter of a fuel injector and a first outer perimeter that is smaller than an inner perimeter of a first section of a fuel injector receiving aperture; and a second section, the second section defining a second inner perimeter that is bigger than an outer perimeter of a second outer perimeter of a fuel injector and a second outer perimeter configured to be in contact with an inner perimeter of a second segment of a fuel injector receiving aperture.

15 Claims, 2 Drawing Sheets

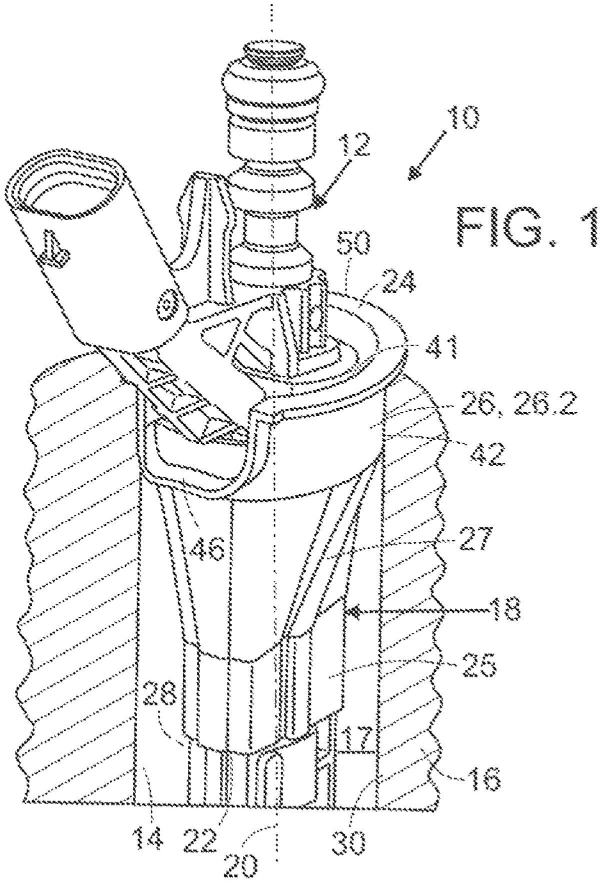
FIG. 1
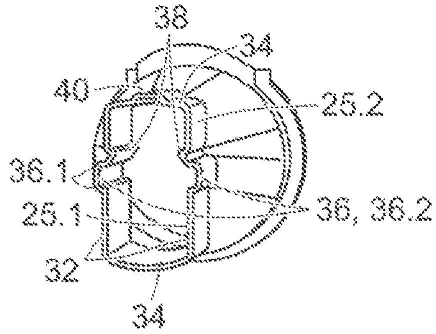
FIG. 2
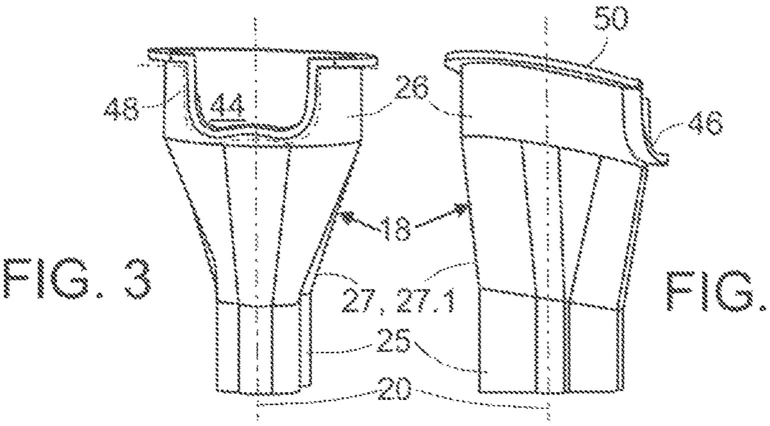
FIG. 3
FIG. 4
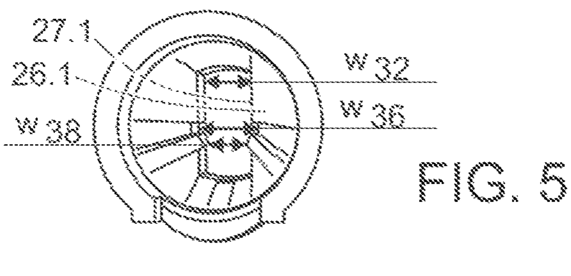
FIG. 5

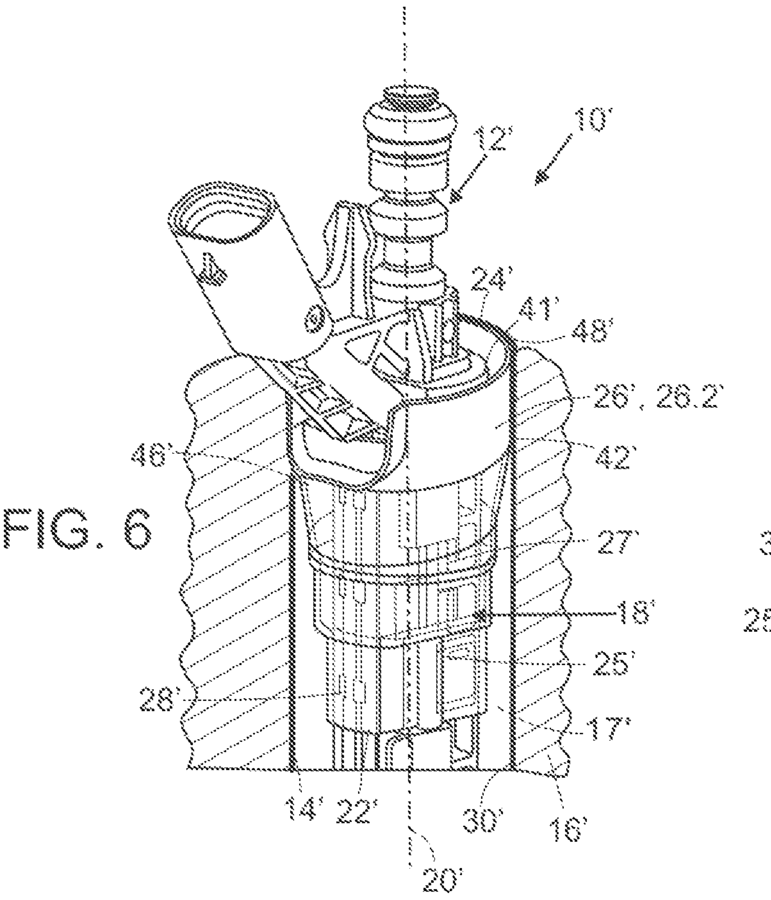
FIG. 6
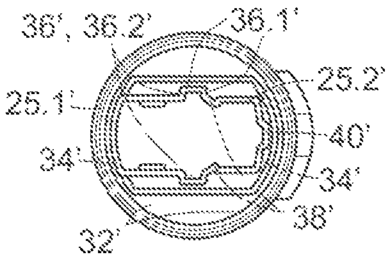
FIG. 7
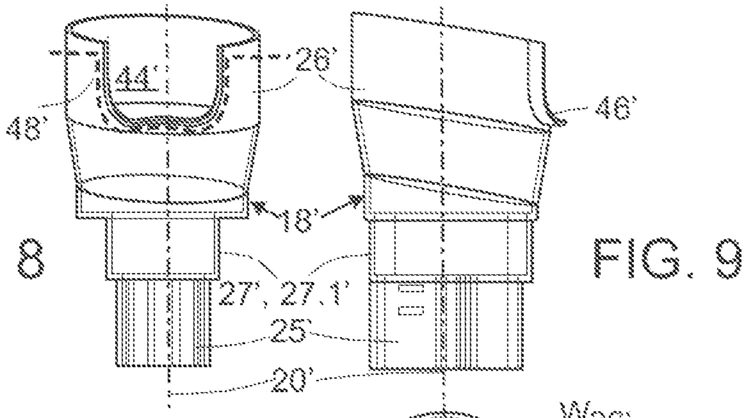
FIG. 8
FIG. 9
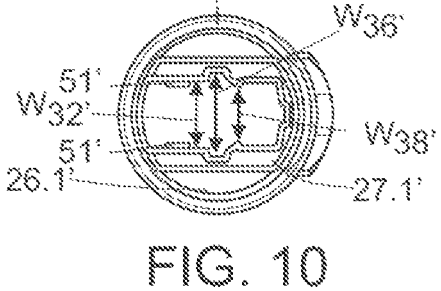
FIG. 10

FUEL INJECTOR DUST SEAL

TECHNICAL FIELD

The present disclosure relates to a fuel injector dust seal.

BACKGROUND

Known fuel injector seals have the shape of a ring and are mounted between the fuel injector and a fuel injector receiving aperture defined by a cylinder head. The contact surface of the seal and the fuel injector are between an inner perimeter of the ring and an outer portion of the fuel injector. The contact surface of the seal and the fuel injector receiving aperture are between an outer perimeter of the ring and a segment of the fuel injector. The contact surfaces define a plane. Therefore, radial forces between the fuel injector and the side of fuel injector receiving aperture may be exerted via the seal when the fuel injector and the fuel injector receiving aperture are not perfectly aligned. This may result in high pressure on the seal. It may also result in a gap between the seal and either the fuel injector or between the seal and the fuel injector receiving aperture. It is desirable to provide a fuel injector dust seal reducing radial forces between a fuel injector and its fuel injector receiving aperture.

SUMMARY

One aspect of this disclosure is directed to a fuel injector dust seal comprising: a sleeve configured to be arranged between a fuel injector and a fuel injector receiving aperture defined by a cylinder head, the sleeve defining a longitudinal axis and comprising an elongated tubular shape with a first axial end and a second axial end opposite from the first axial end; the sleeve further comprising: a first section extending along the longitudinal axis and away from the first axial end, the first section defining a first inner perimeter configured to be in contact with a first outer portion of a fuel injector and a first outer perimeter that is smaller than a first segment of a fuel injector receiving aperture; and a second section extending along the longitudinal axis from the second axial end towards the first section, the second section defining a second inner perimeter that is bigger than a second outer portion of a fuel injector and a second outer perimeter configured to be in contact with a second segment of a fuel injector receiving aperture.

In another aspect, the first section and the second section are configured to provide a dust seal.

In another aspect, the first inner perimeter of the first section is configured to fit the first outer portion of a fuel injector.

In another aspect, the first inner perimeter of the first section defines a first cross section that defines a plane which is at a right angle to the longitudinal axis and the first section comprises a first pair of side walls that are parallel to each other and a second pair of side walls connecting the first pair of side walls and the first pair of side walls and the second pair of side walls limit the first cross section.

In another aspect, the first inner perimeter of the first section comprises notches extending towards the longitudinal axis configured to provide an axial form fit with a fuel injector.

In another aspect, the first pair of side walls each comprise a slot parallel to the longitudinal axis, In another aspect, each slot consists of two parallel slot sides and a slot bottom and the slots of the first pair of side walls define a width that is bigger than a width defined by the first pair of side walls.

In another aspect, the first pair of side walls each comprise a ridge parallel to the longitudinal axis, the ridges define a width that is smaller than a width between the first pair of side walls.

In another aspect, the ridges are arranged adjacent to the slots.

In another aspect, the second pair of side walls are rounded.

In another aspect, one of the second pair of side walls comprises a slot parallel to the longitudinal axis.

In another aspect, the second section defines a side opening extending along the longitudinal axis, away from the second axial end and towards the first section and the sleeve comprises a first rim along the side opening radially extending away from the longitudinal axis configured to be in contact with a first part of an entrance segment of a fuel injector receiving aperture.

In another aspect, the sleeve comprises a second rim along the second axial end and radially extending away from the second section configured to be in contact with a second part of an entrance segment of a fuel injector receiving aperture.

In another aspect, the first section and the second section are offset along the longitudinal axis by a central section of the sleeve that is arranged between the first section and the second section.

In another aspect, an axial length of the first section and an axial length of the second section are shorter than an axial length of the central section.

In another aspect, the central section defines a central inner perimeter that is bigger than a second outer portion of a fuel injector and a central outer perimeter that is smaller than a central segment of a fuel injector receiving aperture.

In another aspect, a cross section of the central section defines a plane that is vertical to the longitudinal axis and the cross section of the central section increases in size along the longitudinal axis from the first section towards the second section.

In another aspect, a fuel injector dust seal comprises: a fuel injector and a sleeve configured to be arranged between the fuel injector and a fuel injector receiving aperture defined by a cylinder head, the sleeve defines a longitudinal axis and comprises an elongated tubular shape with a first axial end and a second axial end opposite from the first axial end; the sleeve further comprises: a first section extending along the longitudinal axis and away from the first axial end, the first section defines a first inner perimeter configured to be in contact with a first outer portion of the fuel injector and a first outer perimeter that is smaller than a first segment of a fuel injector receiving aperture; and a second section extending along the longitudinal axis from the second axial end towards the first section, the second section defines a second inner perimeter that is bigger than a second outer portion of the fuel injector and a second outer perimeter configured to be in contact with a second segment of a fuel injector receiving aperture, and the sleeve is mounted on the fuel injector.

In another aspect, a fuel injector dust seal comprises: a fuel injector and a sleeve configured to be arranged between the fuel injector and a fuel injector receiving aperture defined by a cylinder head, the sleeve defines a longitudinal axis and comprises an elongated tubular shape with a first axial end and a second axial end opposite from the first axial end; the sleeve further comprises: a first section extending along the longitudinal axis and away from the first axial end, the first section defines a first inner perimeter configured to be in contact with a first outer portion of the fuel injector and a first outer perimeter that is smaller than a first segment of a fuel injector receiving aperture; and a second section extending along the longitudinal axis from the second axial end towards the first section, the second section defines a second inner perimeter that is bigger than a second outer portion of the fuel injector and a second outer perimeter configured to be in contact with a second segment of a fuel injector receiving aperture, and the sleeve is mounted in the fuel injector receiving aperture of the cylinder head.

The above aspects of this disclosure and other aspects will be explained in greater detail below with reference to the attached drawings.

BRIEF DESCRIPTION OF THE DRAWINGS

FIG. 1 depicts parts of a fuel injector and a first embodiment of a sleeve mounted in fuel injector receiving in a perspective view.

FIG. 2 depicts a perspective bottom view or the sleeve of FIG. 1.

FIG. 3 depicts a front view or of FIG. 2.

FIG. 4 depicts a top view of FIG. 2.

FIG. 5 depicts a side view of FIG. 3.

FIG. 6 depicts parts of a fuel injector and a second embodiment of a sleeve mounted in fuel injector receiving in a perspective view.

FIG. 7 depicts a perspective bottom view or the sleeve of FIG. 6.

FIG. 8 depicts a front view or of FIG. 7.

FIG. 9 depicts a top view of FIG. 7.

FIG. 10 depicts a side view of FIG. 8.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

FIGS. 1, 2, 3, 4, and 5 depict components of a fuel injector arrangement 10. The fuel injector arrangement 10 comprises a fuel injector 12 which is arranged in a fuel injector receiving aperture 14 defined by a cylinder head 16 of an internal combustion engine. There is a gap 17 between the fuel injector 12 and the fuel injector receiving aperture 14. The lines for the aperture 14 were drawn a little thicker for more clarity. A first embodiment of a fuel injector dust seal comprises a sleeve 18. The sleeve 18 is made from plastic and configured to be arranged between the fuel injector 12 and the fuel injector receiving aperture 14 of the cylinder head 16. The sleeve 18 is made from an opaque plastic and therefore the parts of the fuel injector 12 in FIG. 1 covered by the sleeve 18 are not visible. In comparison, FIG. 6 shows a fuel injector 12' covered by a sleeve 18' made from transparent plastic. The sleeve 18 may be made from a rather transparent or rather opaque plastic. Going back to FIGS. 1, 2, 3, 4, and 5, the sleeve 18 defines a longitudinal axis 20 (FIGS. 1, 3, and 4) and has an elongated tubular shape with a first axial end 22 and a second axial end 24 opposite from the first axial end 22. When the sleeve 18 is mounted on the fuel injector 12 the longitudinal axis 20 of the sleeve 18 is the same as a longitudinal axis defined by the fuel injector 12. When the sleeve 18 is mounted in the fuel injector receiving aperture 14, the longitudinal axis 20 of the sleeve 18 is the same as a longitudinal axis defined by the fuel injector receiving aperture 14. Hence, when assembled, the fuel injector 12, the fuel injector receiving aperture 14 and the sleeve 18, define the same longitudinal axes 20. Along its longitudinal axis 20, the sleeve 18 comprises a first section 25 at the first axial end 22 and a second section 26 at the second axial end 24. The first section 25 and the second section 26 may be connected by a central section 27.

The first section 25 of the sleeve 18 extends along the longitudinal axis 20 and away from the first axial end 22. The first section 25 of the sleeve 18 defines a first inner perimeter 25.1 and a first outer perimeter 25.2. The first inner perimeter 25.1 of the first section 25 is configured to be in contact with a first outer portion 28 of the fuel injector 12. The first inner perimeter 25.1 of the first section 25 is configured to fit the first outer portion 28 of the fuel injector 12. This provides for a dust seal between the fuel injector 12 and the sleeve 18. The first outer perimeter 25.2 of the first section 25 is smaller than a first segment 30 of the fuel injector receiving aperture 14. The first outer perimeter 25.2 being smaller than the first segment 30 means that there is no contact or just a light contact that does not transmit any noticeable radial forces. This may avoid, or at least reduce, radial forces transmitted by the sleeve 18 from the fuel injector 12 to the fuel injector receiving aperture 14.

The first inner perimeter 25.1 of the first section 25 defines a first cross section. The first cross section defines a plane which is at a right angle to the longitudinal axis 20. The first section 25 comprises a first pair of side walls 32 that are parallel to each other and a second pair of side walls 34 connecting the first pair of side walls 32. The first pair of side walls 32 and the second pair of side walls 34 limit the first cross section. The first pair of side walls 32 each comprise a slot 36 parallel to the longitudinal axis 20. Each slot 36 is defined by two parallel slot sides 36.1 and a slot bottom 36.2. The slots 36, in particular the slot bottoms 36.2, of the first pair of side walls 32 define a width $w_{36}$. The width $w_{36}$ is bigger than a width $w_{32}$ defined by the first pair of side walls 32. The first pair of side walls 32 each comprise a ridge 38 parallel to the longitudinal axis 20. The ridges 38 define a width $w_{38}$ that is smaller than the width w32 between the first pair of side walls 32. The ridges 38 are arranged adjacent to the slots 36. The second pair of side walls 34 are rounded. One of the second pair of side walls 34 comprises a slot 40 parallel to the longitudinal axis 20. These features allow the first inner perimeter 25.1 of the first section 25 to fit tight around the corresponding first outer portion 28 of the fuel injector 12. The tight fit is such that the fuel injector 12 can be pushed into sleeve 18 either manually, with a tool, or with an assembly device.

The second section 26 extends from the second axial end 24 along the longitudinal axis 20 towards the first section 25. The second section 26 defines a second inner perimeter 26.1 that is bigger than a second outer portion 41 of the fuel injector 12. The inner perimeter 26.1 may be sized such that there is no contact with the second outer portion 41. The inner perimeter 26.1 may be sized such that there is light contact with the second outer portion 41 not transmitting any noticeable radial forces. The second section 26 further defines a second outer perimeter 26.2 configured to be in contact with a second segment 42 of the fuel injector receiving aperture 14. The contact is such as described above regarding IP5X.

The second section 26 defines a side opening 44 of the sleeve 18 extending along the longitudinal axis 20, away from the second axial end 24 and towards the first section 25. The sleeve 18 comprises a first rim 46 along the edge of the side opening 44 that radially extends away from the longitudinal axis 20. The first rim 46 is configured to be in contact with an entrance segment 48 (depicted with thicker solid lines in FIG. 6 and thicker dashed lines in FIG. 3) of the fuel injector receiving aperture 14. The sleeve 18 comprises a second rim 50 along the second axial end 24 radially extending away from the second section 26. The second rim 50 is configured to be in contact with the rest of the entrance segment 48 of the fuel injector receiving aperture 14.

The first section 25 and the second section 26 are offset along the longitudinal axis 20 by a central section 27 of the sleeve 18. The central section 27 is arranged between the first section 25 and the second section 26. An axial length of the first section 25 and an axial length of the second section 26 are shorter than an axial length of the central section 27. The central section 27 defines a central inner perimeter 27.1 that is bigger than a central portion of the fuel injector 12 between the first outer portion 28 and the second outer portion 41. The central section 27 also defines a central outer perimeter 27.1 that is smaller than a central segment of the fuel injector receiving aperture 14. A cross section of the central section 27 defines a plane that is vertical to the longitudinal axis 20. The cross section of the central section 27 increases in size along the longitudinal axis 20 from the first section 25 towards the second section 26.

When the fuel injector arrangement 10 is assembled, the sleeve 18 is first inserted into the fuel injector receiving aperture 14 of the cylinder head 16. When the first rim 46 and the second rim 50 reach the entrance segment 48 they prevent the sleeve 18 from further moving into the fuel injector receiving aperture 14. When the fuel injector 12 and the sleeve 18 are mounted in the fuel injector receiving aperture 14 of the cylinder head 16 the first section 25 and the second section 26 provide a dust seal. When the fuel injector 12 is removed there is no or only very little dust in the gap 17 that could fall into the cylinder and pose problems when the engine is restarted.

FIGS. 6, 7, 8, 9, and 10 depict components of a fuel injector arrangement 10'. The fuel injector arrangement 10' comprises a fuel injector 12' which is arranged in a fuel injector receiving aperture 14' defined by a cylinder head 16' of an internal combustion engine. This defines a gap 17' between the fuel injector 12' and the fuel injector receiving aperture 14'. A second embodiment of a fuel injector dust seal comprises a sleeve 18'. The sleeve 18' is made from plastic and configured to be arranged between the fuel injector 12' and the fuel injector receiving aperture 14' of the cylinder head 16'. The sleeve 18' is made from transparent plastic, and therefore the parts of the fuel injector 12' covered in FIG. 6 are visible. The sleeve 18' may be made from a rather transparent or rather opaque plastic. The sleeve 18' defines a longitudinal axis 20' and comprises an elongated tubular shape with a first axial end 22' and a second axial end 24' opposite from the first axial end 22'. When the sleeve 18' is mounted on the fuel injector 12' the longitudinal axis 20' of the sleeve 18' is the same as a longitudinal axis defined by the fuel injector 12'. When the sleeve 18' is mounted in the fuel injector receiving aperture 14', the longitudinal axis 20' of the sleeve 18' is the same as a longitudinal axis defined by the fuel injector receiving aperture 14'. Hence, when assembled, the fuel injector 12', the fuel injector receiving aperture 14' and the sleeve 18', define the same longitudinal axes 20'. Along it's longitudinal axis 20', the sleeve 18' comprises a first section 25' at the first axial end 22' and a second section 26' at the second axial end 24'. The first section 25' and the second section 26' may be connected by a central section 27'.

The first section 25' of the sleeve 18' extends along the longitudinal axis 20' and away from the first axial end 22'. The first section 25' of the sleeve 18' defines a first inner perimeter 25.1' and a first outer perimeter 25.2'. The first inner perimeter 25.1' of the first section 25' is configured to be in contact with a first outer portion 28' of the fuel injector 12'. The first inner perimeter 25.1' of the first section 25' is configured to fit the first outer portion 28' of the fuel injector 12'. This provides for a dust seal between the fuel injector 12' and the sleeve 18'. As mentioned above, dust seal in the context of the present disclosure corresponds to the definition of at least IP5X. In this second embodiment as well, the first outer perimeter 25.2' of the first section 25' is smaller than a first segment 30' of the fuel injector receiving aperture 14'. This may avoid, or at least reduce, radial forces transmitted by the sleeve 18' from the fuel injector 12' to the fuel injector receiving aperture 14'.

The first inner perimeter 25.1' of the first section 25' defines a first cross section. The first cross section defines a plane which is at a right angle to the longitudinal axis 20'. The first section 25' comprises a first pair of side walls 32' that are parallel to each other and a second pair of side walls 34' connecting the first pair of side walls 32'. The first pair of side walls 32' and the second pair of side walls 34' limit the first cross section. The first pair of side walls 32' each comprise a slot 36' parallel to the longitudinal axis 20'. Each slot 36' consists of two parallel slot sides 36.1' and a slot bottom 36.2'. The slots 36', in particular the slot bottoms 36.2', of the first pair of side walls 32' define a width $w_{36'}$. The width $w_{36'}$ is bigger than a width $w_{32'}$ defined by the first pair of side walls 32'. The first pair of side walls 32' each comprise a ridge 38' parallel to the longitudinal axis 20'. The ridges 38' define a width $w_{38'}$ that is smaller than the width $w_{32'}$ between the first pair of side walls 32'. The ridges 38' are arranged adjacent to the slots 36'. The second pair of side walls 34' are rounded. One of the second pair of side walls 34' comprises a slot 40' parallel to the longitudinal axis 20'. These features allow the first inner perimeter 25.1' of the first section 25' to fit tight around the corresponding outer portion 28' of the fuel injector 12'. The tight fit is such that the fuel injector 12' can be pushed into sleeve 18' either manually, with a tool or with an assembly device.

The first inner perimeter 25.1' comprises notches 51' extending towards the longitudinal axis 20. The notches 51' are configured to provide an axial form fit with the fuel injector 12'. This allows the sleeve 18' to be attached to the fuel injector 12'. Then the fuel injector 12' can be inserted together with the sleeve 18' into the fuel injector receiving aperture 14'. The notches 51' may provide an axial form fit of the sleeve 18' on the fuel injector 12'.

The second section 26' extends from the second axial end 24' along the longitudinal axis 20' towards the first section 25'. The second section 26' defines a second inner perimeter 26.1' that is bigger than a second outer portion 41' of the fuel injector 12'. The second section 26' further defines a second outer perimeter 26'.2 configured to be in contact with a second segment 42' of the fuel injector receiving aperture 14'.

The second section 26' defines a side opening 44' extending along the longitudinal axis 20', away from the second axial end 24' and towards the first section 25'. The sleeve 18' comprises a first rim 46' along the edge of the side opening 44' that radially extends away from the longitudinal axis 20'. The first rim 46' is configured to be in contact with an entrance segment 48' (depicted with dashed lines in FIG. 3) of the fuel injector receiving aperture 14'.

The first section 25' and the second section 26' are offset along the longitudinal axis 20' by a central section 27' of the sleeve 18'. The central section 27' is arranged between the first section 25' and the second section 26'. An axial length of the first section 25' and an axial length of the second section 26' are shorter than an axial length of the central section 27'. The central section 27' defines a central inner perimeter 27.1' that is bigger than a central portion of the fuel injector 12' between the first outer portion 28' and the second outer portion 41'. The central section 27' also defines a central outer perimeter 27.1' that is smaller than a central segment of the fuel injector receiving aperture 14'. A cross section of the central section 27' defines a plane that is vertical to the longitudinal axis 20'. The cross section of the central section 27' also increases in size along the longitudinal axis 20' from the first section 25' towards the second section 26'. But the second cross section comprises at least one step to increase in size along the longitudinal axis 20'.

When the fuel injector arrangement 10' is assembled the sleeve 18' is inserted into the fuel injector receiving aperture 14' of the cylinder head 16'. When the rims 46' reach the entrance segment 48' they are prevented from further moving into the fuel injector receiving aperture 14'. The fuel injector 12' is then inserted into the fuel injector receiving aperture 14'. When the sleeve 18' is mounted in the fuel injector receiving aperture 14' of the cylinder head 16' the first section 25' and the second section 26' are configured to provide a dust seal. When the fuel injector 12' is removed there is no or only very little dust in the gap 17' that could fall into the cylinder of the engine and pose problems when the engine is restarted.

What is claimed is:

1. Fuel injector dust seal comprising: a sleeve configured to be arranged between a fuel injector and a fuel injector receiving aperture defined by a cylinder head, the sleeve defining a longitudinal axis and comprising an elongated tubular shape with a first axial end and a second axial end opposite from the first axial end; the sleeve further comprising: a first section extending along the longitudinal axis and away from the first axial end, the first section defining a first inner perimeter configured to be in contact with a first outer portion of a fuel injector and the first section further defining a first outer perimeter that is smaller than an inner perimeter of a first segment of a fuel injector receiving aperture; and a second section extending along the longitudinal axis from the second axial end towards the first section, the second section defining a second inner perimeter that is bigger than an outer perimeter of a second section of a fuel injector and the second section further defining a second outer perimeter configured to be in contact with an inner perimeter of a second segment of a fuel injector receiving aperture, wherein the first inner perimeter of the first section defines a first cross section that defines a plane which is at a right angle to the longitudinal axis, wherein the first section comprises a first pair of side walls that are parallel to each other and a second pair of side walls connecting the first pair of side walls and wherein the first pair of side walls and the second pair of side walls limit the first ross section, and wherein the first pair of side walls each comprise a slot parallel to the longitudinal axis, wherein each slot consists of two parallel slot sides and a slot bottom, and wherein the slots of the first pair of side walls define a width that is bigger than a width defined by the first pair of side walls.

2. Fuel injector dust seal according to claim 1, wherein the first section and the second section are configured to provide a dust seal.

3. Fuel injector dust seal according to claim 1, wherein the first inner perimeter of the first section is configured to fit the first outer portion of a fuel injector.

4. Fuel injector dust seal according to claim 3, wherein the first inner perimeter comprises notches extending towards the longitudinal axis configured to provide an axial form fit with a fuel injector.

5. Fuel injector dust seal according to claim 1, wherein the first pair of side walls each comprise a ridge parallel to the longitudinal axis, wherein the pair of ridges define a width that is smaller than a width between the first pair of side walls.

6. Fuel injector dust seal according to claim 1, wherein each ridge is arranged adjacent to a slot.

7. Fuel injector dust seal according to claim 1, wherein the second pair of side walls are rounded.

8. Fuel injector dust seal according to claim 1, wherein one of the second pair of side walls comprises a slot parallel to the longitudinal axis.

9. Fuel injector dust seal according to claim 1, wherein the first section and the second section are offset along the longitudinal axis by a central section of the sleeve which is arranged between the first section and the second section.

10. Fuel injector dust seal according to claim 9, wherein an axial length of the first section and an axial length of the second section are shorter than an axial length of the central section.

11. Fuel injector dust seal according to claim 9, wherein the central section defines a central inner perimeter that is bigger than a second outer portion of a fuel injector and a central outer perimeter that is smaller than a central segment of a fuel injector receiving aperture.

12. Fuel injector dust seal according to claim 9, wherein a cross section of the central section defines a plane that is vertical to the longitudinal axis and wherein the cross section of the central section increases in size along the longitudinal axis from the first section towards the second section.

13. Fuel injector dust seal according to claim 12, wherein a cross section of the central section comprises at least one step to increase in size along the longitudinal axis.

14. Fuel injector dust seal comprising: a sleeve configured to be arranged between a fuel injector and a fuel injector receiving aperture defined by a cylinder head, the sleeve defining a longitudinal axis and comprising an elongated tubular shape with a first axial end and a second axial end opposite from the first axial end; the sleeve further comprising: a first section extending along the longitudinal axis and away from the first axial end, the first section defining a first inner perimeter configured to be in contact with a first outer portion of a fuel injector and the first section further defining a first outer perimeter that is smaller than an inner perimeter of a first segment of a fuel injector receiving aperture; and a second section extending along the longitudinal axis from the second axial end towards the first section, the second section defining a second inner perimeter that is bigger than an outer perimeter of a second section of a fuel injector and the second section further defining a second outer perimeter configured to be in contact with an inner perimeter of a second segment of a fuel injector receiving aperture, wherein the second section defines a side opening extending along the longitudinal axis, away from the second axial end, and towards the first section; and wherein the sleeve comprises a first rim extending along the side opening radially extending away from the longitudinal axis and configured to be in contact with a first part of an entrance segment of a fuel injector receiving aperture.

15. Fuel injector dust seal according to claim 14, wherein the sleeve comprises a second rim along the second axial end and radially extending away from the second section configured to be in contact with a second part of an entrance segment of a fuel injector receiving aperture.

* * * * *